United States Patent
Ford

(10) Patent No.: US 7,435,177 B1
(45) Date of Patent: Oct. 14, 2008

(54) METHOD AND SYSTEM FOR VIDEO-BASED NAVIGATION IN AN APPLICATION ON A HANDHELD GAME DEVICE

(75) Inventor: Jason Ford, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 520 days.

(21) Appl. No.: 10/987,333

(22) Filed: Nov. 12, 2004

(51) Int. Cl. *A63F 13/10* (2006.01)
(52) U.S. Cl. ........................ 463/30
(58) Field of Classification Search .......... 463/1, 463/30–33, 36, 39, 40, 42, 46; 345/156–184; 455/566; 715/863–865
See application file for complete search history.

(56) References Cited

U.S. PATENT DOCUMENTS

| | | | |
|---|---|---|---|
| 6,201,554 B1 | 3/2001 | Lands | 346/169 |
| 6,449,363 B1 | 9/2002 | Kielsnia | |
| 6,624,824 B1 | 9/2003 | Tognazzini et al. | 345/684 |
| 6,766,036 B1 | 7/2004 | Pryor | 382/103 |
| 6,847,351 B2 | 1/2005 | Noguera | 345/158 |
| 6,933,923 B2 | 8/2005 | Feinstein | 345/158 |
| 6,939,231 B2 * | 9/2005 | Mantyjarvi et al. | 463/30 |
| 2002/0027549 A1 | 3/2002 | Hirshberg | |
| 2003/0003976 A1 | 1/2003 | Mura | |
| 2004/0125073 A1 | 7/2004 | Potter et al. | 345/156 |
| 2005/0208978 A1 * | 9/2005 | Pylkko | 455/566 |

FOREIGN PATENT DOCUMENTS

| TW | 544637 | * | 8/2003 |
|---|---|---|---|
| WO | WO 2005/043332 | | 5/2005 |

OTHER PUBLICATIONS

International Search Report and Written Opinion of the International Searching Authority from Application No. PCT/US04/36179, dated Jul. 6, 2005.

* cited by examiner

*Primary Examiner*—Scott E Jones

(57) ABSTRACT

A handheld game device includes a processing element that executes a game application, such as for example a car-racing application or other interactive game which is viewed on a screen display provided in the game device. The game device also contains a camera, preferably taking the form of an electronic video camera, capturing image frames at a suitable frame rate, such as 10 or 20 frames per second or more. The game device uses movement information obtained from a sequence of images obtained from the camera as a basis to navigate the user through a game that the user is playing on the device. For example, if the user tilts the device to the left, the tilting action results in image movement. The image movement is interpreted as user input of movement commands for the video game application, just as joystick movement is interpreted as movement commands for the video game application.

8 Claims, 3 Drawing Sheets

METHOD AND SYSTEM FOR VIDEO-BASED NAVIGATION IN AN APPLICATION ON A HANDHELD GAME DEVICE

BACKGROUND

This invention relates to video game devices and more particularly to a hand-held interactive game device in which the user interacts with the game via a camera built into the video game device. The camera includes circuitry processing acquired images to detect movement of the game device. The game device can be a special purpose game device or game player, or other portable device with game player and camera functions, such as a portable cellular telephone with a video camera.

Hand-held interactive game players typically use a joystick or buttons as a mode of interaction with a video game. For example, the user launches the video game and the player manipulates the buttons and/or joystick to move a character in the video game, drive a car, etc. In such a system, movement of the joystick or presses of a button are translated into information that is fed into the interactive game application, whereupon an entity in the game, such as a car or person, is moved in the application. Such movement is simulated substantially instantaneously on the screen display of the game device.

This invention contemplates a different mode of interaction with a game application, and in particular one based on a camera built into the game device and processing of sequences of images captured by the camera. For example, the player can tilt the game device or move it to the left to simulate steering a car around a corner to the left in an interactive car racing video game. Such movement of the game device is detected by processing of a sequence of images captured by the camera during the movement. The movement of the game device is translated to movement information that is fed to the game application, just as joystick movement or button presses are translated to movement information. Substantially simultaneously with the camera movement, the car or person in the video game moves in accordance with the video game device movement. As such, the present invention presents a more user friendly and intuitive manner of interacting with interactive video games.

U.S. Pat. No. 6,766,036 to Pryor describes camera based man-machine interfaces. The '036 patent disclosed several possible ways of game interaction using a camera. These methods include using a camera to sense a player or players in a game, to sense objects held or manipulated by a player, such as a ball, to sense physical tokens used in a game (e.g., MONOPOLY™ tokens), to sense game accessories such as checkerboards and croquet wickets, and to compare positions of object with respect to other objects or players. However, the '036 patent does not teach or suggest interaction with video games played on a hand-held game device in the manner described herein and thus does not overcome the deficiencies in the prior art.

SUMMARY

A handheld game device includes a processing element that executes a game application, such as for example a car-racing application or other interactive game which is viewed on a screen display provided in the game device. The game device also contains a camera, preferably taking the form of an electronic video camera capturing image frames at a suitable frame rate, such as 10 or 20 frames per second or more. The game device uses movement information obtained from a sequence of images obtained from the camera as a basis to navigate the user through a game that the user is playing on the device. In one possible embodiment, the handheld game device can be a camera phone that has an integrated video camera. The user can play various games on the display screen on the camera phone.

By way of example, when the user is playing a car-racing game on the handheld game device, the user could tilt the device to the left or right to cause the car to turn to the left or right in the game. To accomplish this, the game device includes an image analysis module that processes the video image frames to detect movement in the images captured by the video camera, e.g., using cross-correlation algorithms for the entire frame or by detecting movement of a target or spot that is captured in the video frames. For example, if the processing circuitry detects that the image being received by the camera reflects movement of the game device to the left (i.e., the particular spot or target moves to the right in the image), the device would signal to the application accordingly to cause the car in the game to turn to the left. As another example, if the game device is moved closer to the person, the game device could be programmed to interpret such action as a "braking" action and cause the car in the game to slow down.

In theory, the video-based navigation mechanism could allow for navigation in any sort of game on the device, in any of a variety of directions, such as left, right, up, down, forward and backward.

The invention can be characterized as a method of user interaction with a video game application executing on a video game device, comprising the steps of: capturing a sequence of images by a camera incorporated into the video game device; processing the sequence of images to detect movement in the sequence of images; and supplying information as to the detected movement to a processor executing the video game application, wherein the detected movement is interpreted as user input of movement commands to the video game application.

DETAILED DESCRIPTION OF PREFERRED EMBODIMENT

Figure 1:
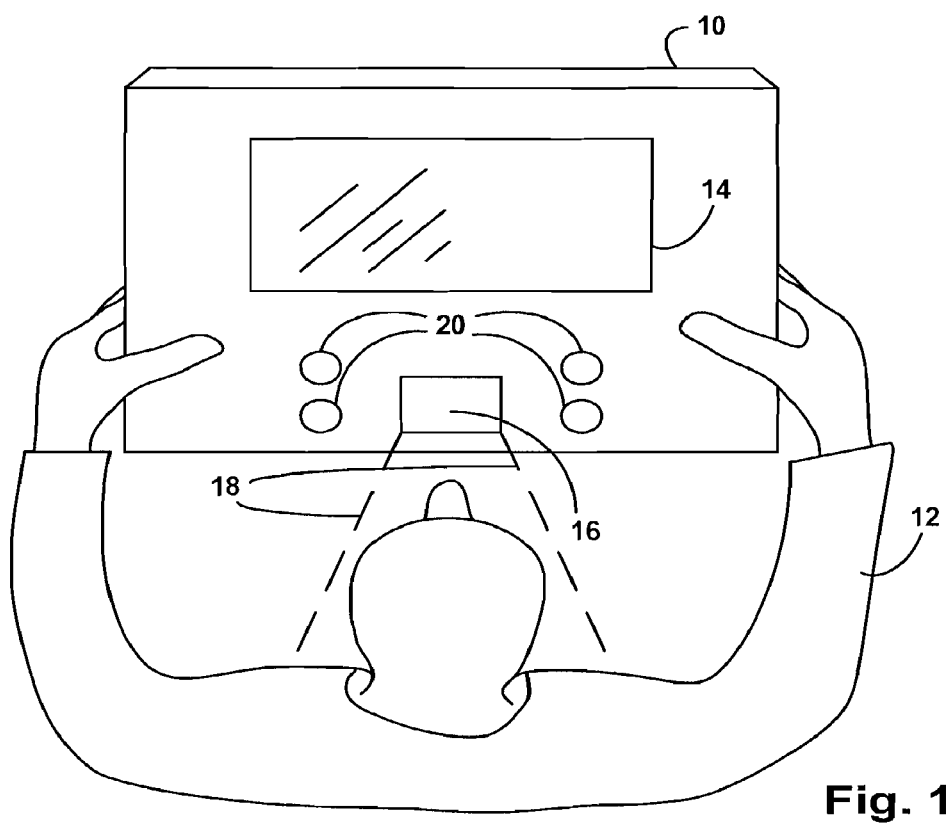
FIG. 1 is an overhead view of a game player holding a video game device which includes a camera in accordance with a representative example of the invention. The game device is not shown to scale in order to show the features of the game device in more detail. Moreover, the game device can take a variety of forms and no particular form is critical to practice the invention.
Figure 2:
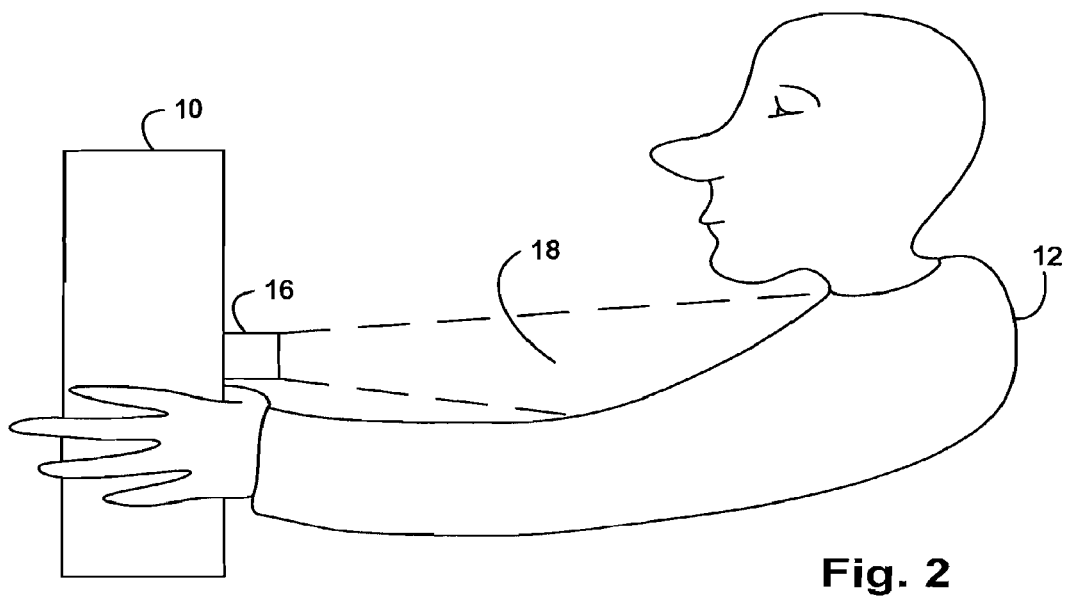
FIG. 2 is a side view of the game player and game device of FIG. 1.

FIG. 1 is an overhead view of a game player 12 holding a video game device 10 which includes a camera 16 in accordance with a representative example of the invention. FIG. 2 is a side view of the game player 12 and game device 10 of FIG. 1. The game device 10 is not shown to scale in order to show the features of the game device in more detail. Moreover, the game device 10 can take a variety of forms and physical layout and no particular form or form factor is critical to practice the invention. For example, the game device can take the form of a portable hand-held game device like those currently on the market, or the form of a cellular telephone equipped with video camera and processing circuitry as described herein, or in some other form or form factor. The principal requirement is that it be hand-held and moveable so that the user can move it to simulate movement commands for the video game application as described herein.

The game device 10 includes a screen display 14 where the player 12 views an interactive video game. The game itself will typically take the form of program instructions in the form of a video game application that is stored in memory in the game device 10 and executed by a processing unit in the game device. The game device may also include buttons 20 or other conventional user interface devices, including a joystick, in the event that the player wishes to interact with the game in conventional manner.

The camera 16 has a field of view 18 indicated by the dashed lines in FIG. 1. The field of view is shown as being in front of the game device 10, but this is not necessary, as will be appreciated from the discussion below. For example, the camera could be located on the other side of the device and have a field of view in the opposite direction. FIGS. 3-6 show a series of images captured by the camera built into the game device, showing movement of a spot in the field of view of the camera as a result of the player moving the video game device. FIGS. 3-6 are described below in the context of a camera whose field of view is directly ahead of the game device (towards the player), but the principles of operation will be the same regardless of the field of view.

As noted above, the camera 16 preferably takes the form of an electronic video camera that captures image frames at a suitable frame rate such that image movement can be detected and fed back to the video game application processor such that the movement can be interpreted by the video game application as user input movement commands and still yield an acceptable user experience. To achieve such results, the camera 16 may have to operate at a frame rate of 10 or 20 frames per second or possibly more. The game device 10 uses movement information obtained from the sequence of images obtained from the camera 16 as a basis to navigate the user through a game that the user 12 is playing on the device 10.

By way of example, when the user is playing a car-racing game on the handheld game device 10, the user 12 could tilt the device 10 to the left or right to cause the car to turn to the left or right in the game. To accomplish this, the game device 10 includes an image analysis module that processes the video image frames obtained from the camera 16 to detect movement of the image captured by the video camera, e.g., using cross-correlation algorithms for the entire frame or by detecting movement of a target or spot that is captured in the video frames. For example, if the image analysis module detects that the image being received by the camera reflects movement of the game device to the left (i.e., the particular spot or target moves to the right in the image), the image analysis module or central processing unit would provide such movement information to the video game application. The application is programmed to interpret such movement information as user input of movement commands for the video game application, just as it does for joystick movements or L or R button presses. The application accordingly causes the car in the game to turn to the left. As another example, if the game device is moved closer to the person, the spot or target in the image may grow larger and such movement is detected by the image analysis module. The game device could be programmed to interpret such movement action as a "braking" action and cause the car in the game to slow down.

Figure 3:
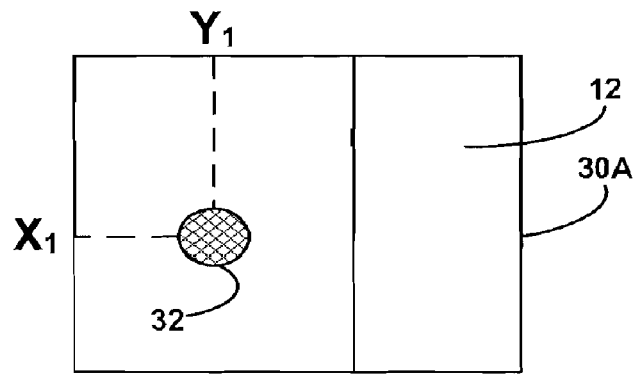
FIGS. 3-6 show a series of images captured by the camera built into the game device, showing movement of a spot in the field of view of the camera as a result of the player moving the video game device.

A few examples of processing of video frame sequences will be described in further detail in FIGS. 3-6. In FIG. 3, the camera field of view captures a region on the chest of the player 12 and the image captured by the camera is shown at 30A. The image includes a feature 32, which could be a design element in the user's shirt, a button, or a special target such as a black or white button or sticker that is specifically used for purposes of image analysis in this invention. The image analysis module in the game player determines the center of the feature 32 and its size (number of pixels in row or column direction). The pixel coordinates of the center 32 are stored as X1 and Y1 pixel coordinates (e.g., the center is in pixel row 434 and in pixel column 359) and the size of the feature 32 is stored as well.

Figure 4:
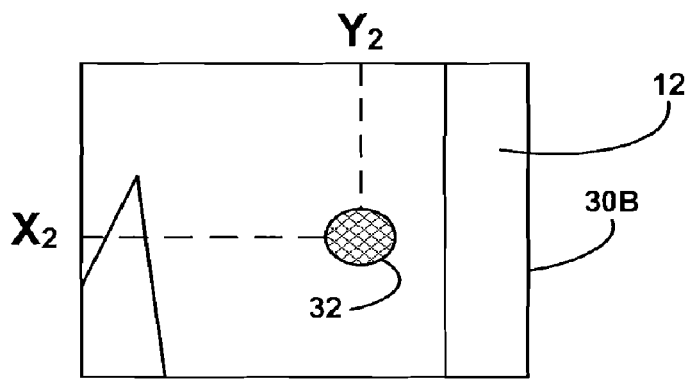

FIG. 4 shows the next image 30 in the sequence of images obtained by the camera 16. The target 32 has moved to new pixel coordinates X2 and Y2. The movement of the target and determination of new pixel coordinates X2 and Y2 could be obtained from a suitable correlation or pattern recognition algorithm which compares image 30B with image 30A to determine the new location of common feature 32 in both images. The change in the pixel addresses (X2-X1 and Y2-Y1) for the center of the feature is thus the image movement that occurred between the image of FIG. 4 and the image of FIG. 3. The change of pixel address (e.g., the image moved to the right and up by 132 pixels in the row direction and 21 pixels in the column direction) is fed to the video game application where it is interpreted as movement commands, to move the car or person in the video game to the right by a certain amount. Obviously, the details on how much to move the car or person in the video game will depend on parameters that will vary from game to game. The video game application is provided with software that interprets image movement information (e.g., vector or direction information) as user movement input commands. The application adapts the images in the video game according to such movement as is known in the video game art.

Figure 5:
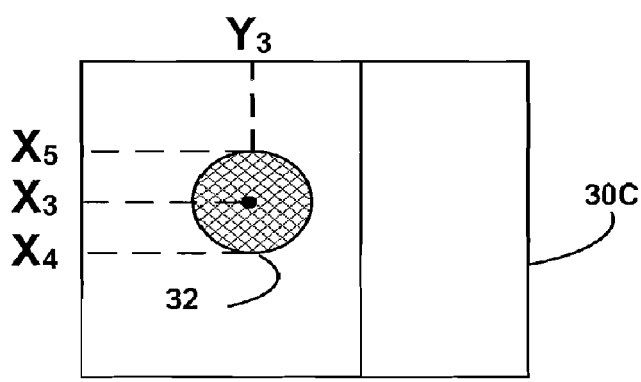

Consider now FIG. 5 and image 30C in the sequence of images. Here, the location of the center of the feature 32 has changed to new location X3 and Y3, and in addition the size of the feature 32 has increased (pixel address X5-pixel address X4). This change in the image would be associated with the player moving the game device closer to the player and slightly to the side. The amount of the change in the size of the target in FIG. 5, as compared to the size of the target in FIG. 4 will dictate how much movement has occurred to bring the game device closer to the player. Such in-out movement and side to side movement is obtained from image analysis of sequential images 30B and 30B and fed to the video game application, where it is interpreted as user movement commands for the game.

Figure 6:
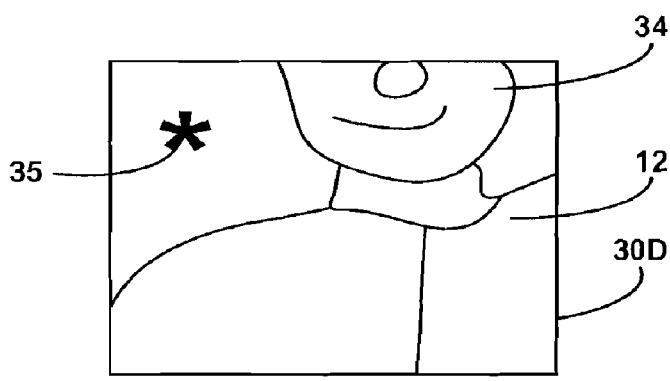

Consider now FIG. 6 and image 30D. If image 30D immediately succeeded image 30C (FIG. 5), the image analysis module may not be able to determine any common points in the two images and thus be unable to determine what motion has occurred. This situation would be prevented by providing fast enough frame rates for the video camera. If it should still occur, the game player could pause the application, provide an error message, and prompt the user to either reposition the game device or use the manual controls. Still other action is possible.

Ideally, the transition between FIG. 5 and FIG. 6 would include a plurality of images that transition from the torso in FIG. 5 and the upper body and head 34 in FIG. 6 and the image analysis module could use the chin, shirt neckline, background object 35, or other object in the image as a new reference point to determine image motion in successive image frames.

Figure 7:
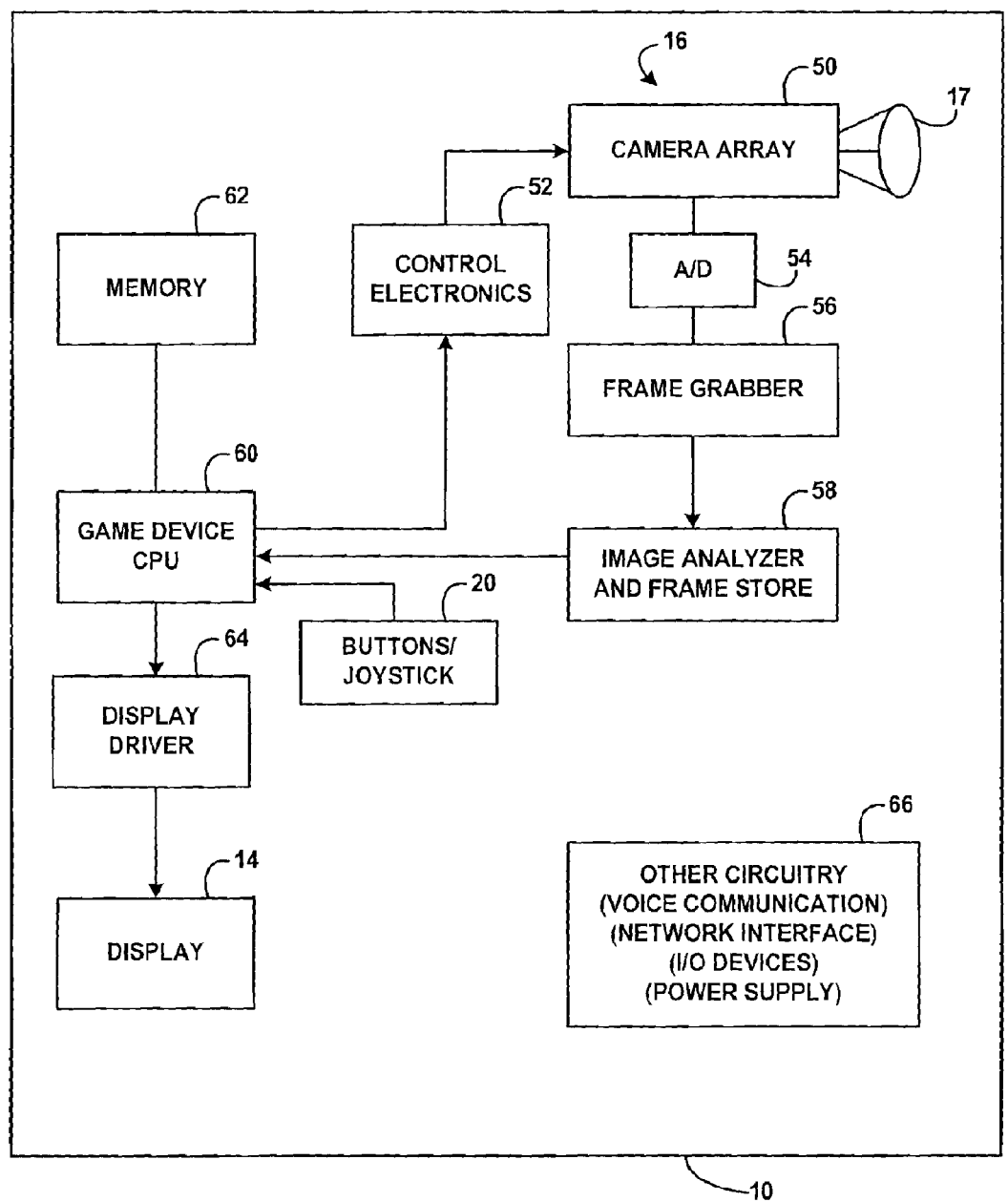
FIG. 7 is a simplified block diagram of the game player of FIG. 1.

FIG. 7 is a simplified block diagram of a representative, non-limiting example of a game player 10 of FIG. 1. The game player includes the camera 16, which in the illustrated embodiment consists of an electronic video camera having an array 50 of pixels arranged in rows and columns and an objective lens 17. The exposure of the camera array 50 is controlled by camera control electronics 52 providing clock signals to the array 50 and/or by a shutter (not shown). The output of pixels in the array 50 is converted to digital form by an analog to digital converter 54. The image frames are captured by a frame grabber 56 and fed to an image analysis module 58 having a memory storing the image frames.

The image analysis module 58 executes correlation algorithms, pattern recognition algorithms, or other suitable image processing algorithms to detect the movement of objects from one image in sequence to the successive image, as described above. The image movement detected by the image analysis module 58 is supplied to a game device central processing unit 60. The CPU 60 executes a game application stored in the memory 62 of the game player 10. The movement information obtained from the image analysis module 58 is interpreted by the game application as user input of movement commands, and the game application responsively moves the car, person or other object in the video game in accordance with the movement information.

The game device 10 may further include optional items such as manual user input controls 20 (buttons and/or joystick). The game player may also include optional circuitry and components 66, which may include voice communication circuitry (in the event that the game device is a cellular telephone), a network interface, other input/output devices such as a speaker or keyboard, power supplies, and other items, the details of which are not important.

The game device 10 also includes a conventional display driver 64 and display 14 for displaying the video game to the player.

Variation from the disclosed embodiments, is contemplated without departure from the scope of this invention. The scope of the invention is to be determined by reference to the appended claims.

I claim:

1. A video game apparatus, comprising, in combination:
   (1) a hand-held game playing device comprising
      a) a memory storing an interactive video game application;
      b) a processing unit for executing the interactive video game application;
      c) a camera adapted to capture a sequence of images during the execution of the video game application;
      d) an image analysis module for processing the sequence of images to detect movement of the game playing device during the execution of the video game application;
      wherein information as the movement detected by the image analysis module is supplied to the processing unit and interpreted by the video game application as user input of movement commands to the video game application; and
   (2) a special optical target for placement in the field of view of the camera when the game playing device is held in the hands of the user during execution of the video game application; wherein the movement of the game playing device in 1 d) is detected by processing the position of the target in the sequence of images.

2. The video game apparatus of claim 1, wherein the camera comprises an electronic video camera.

3. The video game apparatus of claim 1, wherein the game playing device includes a housing and wherein elements a), b), c) and d) are incorporated into the housing.

4. The video game apparatus of claim 1, wherein the game playing device further comprises a cellular telephone.

5. A method of user interaction with a video game application executing on a video game device, comprising the steps of:
   capturing a sequence of images by a camera incorporated into the video game device;
   processing the sequence of images to detect movement in the sequence of images;
   supplying information as to the detected movement to a processor executing the video game application, wherein the detected movement is interpreted as user input of movement commands to the video game application, and
   providing a special optical target for the camera, applying the target to the game player so as to be in the field of view of the camera when the video game devices is held by the player, and wherein the camera images the target in at least one image in the sequence of images.

6. The method of claim 5, wherein the camera comprises an electronic video camera.

7. The method of claim 5, wherein the video game device incorporates cellular telephony functionality.

8. The method of claim 5, wherein the video game application comprises a vehicle racing application.

\* \* \* \* \*